2,533,531

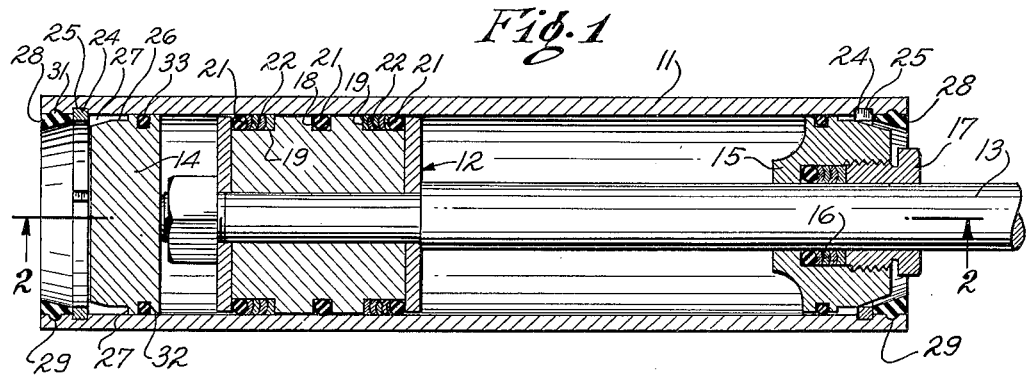
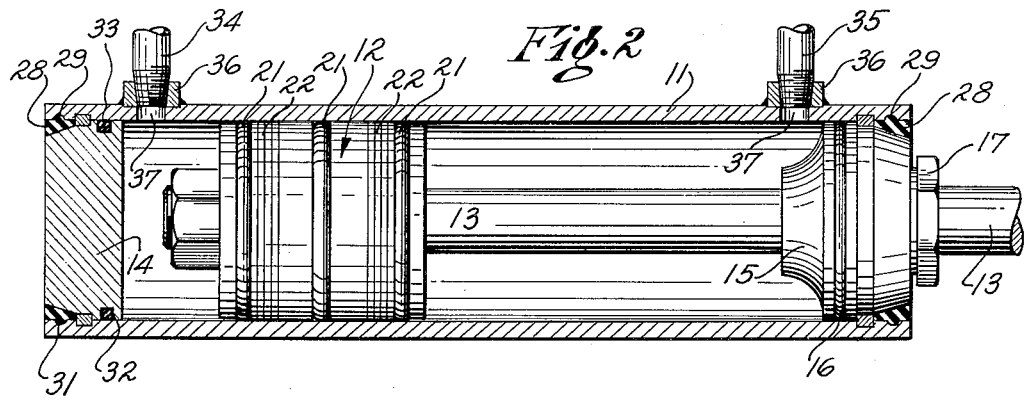
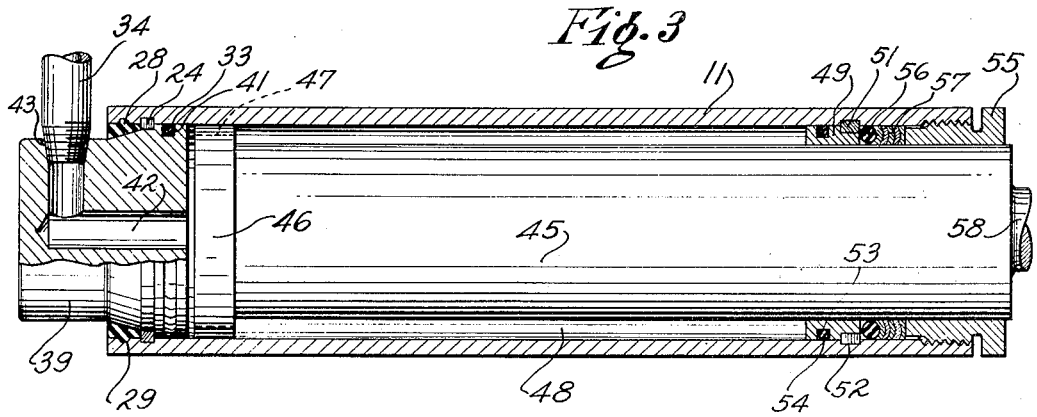
INVENTOR.
WILLIAM T. STEPHENS
BY Frederic B. Schramm
ATTORNEY Patented Dec. 12, 1950

UNITED STATES PATENT OFFICE 2,533,531

CYLINDER ASSEMBLY

William T. Stephens, Painesville, Ohio

Application July 24, 1945, Serial No. 606,866

5 Claims. (Cl. 309—2)

My invention relates to hydraulic and pneumatic operators and methods of making them.

It is an object of my invention to provide an improved, compact, readily assembled and inexpensively fabricated cylinder for fluid-pressure operated systems.

A further object of my invention is to provide improved means of making single and double-acting hydraulic cylinders utilizing smooth tubing for the cylinder, which may be composed of relatively thin stock.

A further object of my invention is to provide improved means for inserting and securing cylinder heads and internally fixed parts in cylinders.

Other and further objects, features and advantages of the invention will become apparent as the description proceeds.

In carrying out the invention in accordance with a preferred form thereof, where parts are to be mounted within a fluid-containing cylinder, I provide an annular groove in the part which is to be mounted within the cylinder, such as a cylinder head for example, and I place in the groove a ring of packing material which tends to absorb the fluid employed in the cylinder.

The part to be mounted in the cylinder is slid into the cylinder, and suitable abutting means or motion stopping means are then mounted in place in the cylinder such as a snap ring, for example, for preventing the inserted part, such as the cylinder head, from being expelled from the cylinder. Before the packing material has had an opportunity to absorb any appreciable amount of the fluid, the fluid pressure is employed for pushing the inserted part against the stop. Thereafter the absorption of fluid by the packing material serves to hold the inserted part tightly in place with respect to motion in either direction.

A better understanding of the invention will be afforded by the following detailed description considered in conjunction with the accompanying drawing in which, Fig. 1 is a longitudinal medial sectional view of a double-acting hydraulic operating cylinder with the cylinder heads pushed into the cylinder and not yet assembled in their final position;

Fig. 2 is a view of a longitudinal section of the operator of Fig. 1 with the cylinder heads in their final position, represented as cut by a plane 2—2;

Fig. 3 is a longitudinal medial sectional view corresponding to Figs. 1 and 2, but showing a single-acting cylinder, with a cylinder head secured in one end of the cylinder in accordance with my invention, and a piston stop ring secured in the other end of the cylinder in accordance with my invention.

Like reference characters are utilized throughout the drawing to designate like parts.

The operator, shown by way of illustration in Figs. 1 and 2, comprises a cylinder 11 composed of relatively thin-walled tubing with a piston 12 slidable therein secured to a piston rod 13 and with cylinder heads 14 and 15 inserted in the ends of the cylinder 11. The cylinder head 15 has an opening for the piston rod 13 with conventional means such as packing 16 and a packing nut 17 for sealing the piston rod 13 slidably in the cylinder head 15. The piston 12 is likewise provided with conventional means for sealing the space between the outer surface of the piston and the inner surface of the cylinder 11. For example, as shown, the piston 12 may have a central annular groove 18 and elongated annular grooves 19 containing O-rings 21 and also crescent cross-section packing rings 22 in the grooves 19. Where the operating fluid is oil, the packing rings 21 and 22 are composed of a suitable oil-resistant, relatively soft, resilient, rubber-like material such as oil-resistant synthetic composition, for example. Whenever any other operating fluid is employed, the packing 16 and also the packing 21 and 22 are composed of a resilient substance which is resistant to the fluid employed, and does not tend to absorb the same so that relatively low-friction slidability is obtained for the piston rod 13 and the piston 12.

In order to prevent expulsion of the cylinder heads 14 and 15 from the ends of the cylinder 11 during the initial assembly operations, suitable temporary or permanent stop means are provided in the ends of the cylinder 11. For example, readily insertable snap rings 24 may be provided which fit in shallow annular grooves 25 formed in the inner surfaces near the ends of the cylinder 11. The cylinder or tube stock 11 may be relatively thin since a shallow groove 25 is sufficient. The cylinder heads 14 and 15 are preferably recessed as shown at 26 to leave a shoulder 27 fitting against the snap ring 24, allowing the remaining portion of the cylinder head to fit under and beyond the snap ring 24.

For the sake of improved appearance, means are provided for filling the space 27 around the outside portions of the cylinder heads 14. Preferably, inserts 28 conforming in shape to the space 27 are provided for filling the end spaces. The inserts 28 may be composed of suitable material, such as plastic for example, and preferably very shallow grooves 29 are provided in the inner surface at the end of the cylinder 11, cooperating with ribs 31 in the inserts 28 for holding the inserts 28 in place.

Annular grooves 32 are formed in the cylinder heads 14 and 15 for receiving packing material or rings 33. The packing rings 33 are composed of a material which tends to absorb the fluid employed in the operating cylinder 11. For example, in the case of oil, such as customarily employed in hydraulic cylinders, the packing rings 33 may be composed of a synthetic composition which absorbs oil, or a natural "swelly" rubber, or a rubber-like material such as the compounded rubber employed in the manufacture of solid rubber tires for vehicles. Suitable connections are provided for the ingress and egress of oil or other operating fluid from the space in the cylinder 11 on either side of the piston 12. For example, conduits or tubing 34 and 35 may be provided.

Where a relatively thin-walled cylinder 11 is employed, spuds 36 are preferably joined to the surface of the cylinder 11 at openings 37 for the ingress and egress of the fluid. The spuds 36 are preferably joined to the cylinder surface by a fusion process such as welding, for example. Where it is desired to avoid any projections whatsoever from the surface of the cylinder 11 so as to obtain full advantage of the thinness of the cylinder wall, the connections for the conduits 34 and 35 may be made to the cylinder heads 14 and 15, as illustrated in the case of the connection for the conduit 34 in Fig. 3. Furthermore, if desired, one of the cylinder heads, such as the head 14, for example, may have attached thereto or formed integral therewith a pivoting eye or the like (not shown). Since the cylinder heads 14 and 15 are readily rotated when first inserted, the construction has the advantage that where any part such as pivot eyes are secured to the cylinder heads 14, the desired angular relationship between such a part and a projection on the cylinder 11, such as a spud 36, may readily be obtained.

In making the hydraulic operator illustrated in Figs. 1 and 2, preferably the first operations are to assemble the piston rod 13 with the head 15 and to assemble the piston 12 with the cylinder 11, the packing rings 16, 21 and 22 having been inserted beforehand. The packing rings 33 are inserted in the grooves 32 of the cylinder heads 14 and 15. The cylinder head 15 is then pushed into the cylinder 11 away from the end of the cylinder head 14, is inserted and pushed at least as far away from the end of the cylinder as illustrated in Fig. 1. It will be understood that the packings 33 are inserted in the grooves 32 before the cylinder heads 14 and 15 are inserted in the cylinder 11.

After the cylinder heads 14 and 15 have been inserted well away from the ends of the cylinder, the snap rings 24 are snapped into place and the inserts 28 are then snapped into place. Thereupon operating fluid is admitted through the conduits 34 and 35. Sufficient fluid pressure is built up preferably by motion of the piston 12 in either direction to push the cylinder heads 14 and 15 outwards against the stop rings 24. Thereupon the fluid seeping around the outer surfaces of the cylinder heads 14 and 15 reaches the packing rings 33 composed of swelly rubber which absorb sufficient fluid to fill up the grooves 32 completely and press outward against the inner surface of the cylinder 11. After sufficient pressure has been built up to hold the cylinder heads 14 and 15 tightly in position, the pressure becomes so great as to prevent the absorption of any more fluid and consequently only the outer portions, if any, of the packing rings 33 are attacked by the fluid. The pressure prevents penetration of the fluid into the interior portions of the packing material, consequently the packing material is not disintegrated but merely swells and serves to wedge or tighten the cylinder heads 14 and 15 into position.

Although a double-acting operator has been illustrated in Figs. 1 and 2, my invention is not limited thereto. For example, as shown in Fig. 3, the invention may be employed in a single-acting operator. In order to avoid any projectoins from the outer surface of the cylinder 11, a cylinder head 39 is employed having an opening or passageway 42 with means for connecting it to the conduit 34. In order that the conduit 34 may enter at right angles to the axis of the cylinder 11, the cylinder head 39 is preferably elongated with a right angle turn in the passageway 42 and the open end 43 is threaded to receive the threaded end of the conduit 34. An annular groove 41 is provided for receiving a fluid absorbing packing ring 33 as in the arrangement of Figs. 1 and 2.

A piston 45 is provided having a sufficiently smaller diameter than the inner diameter of the cylinder 11 to leave space for packing material, and the piston 45 is provided with a head or guard 46 for retaining the piston in the cylinder 11. Openings or vents 47 are provided around the edges of the piston guard 46 to permit ready passage of fluid back and forth between the end of the cylinder and the space 47 between the piston 45 and the inner surface of the cylinder 11.

In order to prevent the piston 45 from being withdrawn from the right hand end of the cylinder and to aid in confining packing material, a stop ring 49 is provided. The stop ring 49 may be formed integral with the cylinder 11, but it is preferably formed as a separate ring insertable in the cylinder 11 in order to permit the use of a simple hollow cylinder 11 and to avoid difficult machining operation. In order to prevent the stop ring 49 from being expelled from the right hand of the cylinder 11 in the initial assembling operation, a snap ring 51 is provided fitting in a shallow slot or groove 52 cut peripherally in the inner surface of the cylinder 11 near the right hand end thereof. The stop ring 49 is provided with an annular groove 53 receiving a ring 54 of packing material, preferably composed of a fluid absorbing substance such as the ring 33.

A packing nut 55 is provided which is threaded into the right hand of the cylinder 11 for confining packing material comprising an O-ring 56 and a plurality of crescent cross-section rings 57. The rings 56 and 57 are composed of a suitable fluid resistant material so that none of the operating fluid is absorbed thereby and a good low-friction seal is provided between the inner surface of the cylinder 11 near the right hand end thereof and the outer surface of the piston 45. The diameter of the piston 45 may be reduced beyond the right hand portion thereof protruding from the cylinder 11 to form a piston rod 58.

Assembly of the apparatus of Fig. 3 is preferably carried out as follows:

First, the piston 45 is inserted in the cylinder 11, then the stop ring 49 with the packing ring 54 inserted therein is slipped over the piston 45 and pushed in from the right hand end of the cylinder toward the middle of the cylinder. Thereafter the piston 45 is pushed far enough to the left to permit the snap ring 51 to be inserted and snapped into the annular groove 52. The packing rings 56 and 57, and the packing nut 55 may then be inserted. Thereafter the cylinder 45 is pulled far enough to the right to permit insertion of the cylinder head 39 into the cylinder 11 toward the middle thereof (the conduit 34 then being disconnected from the cylinder head 39). It will be understood that the packing ring 33 is assembled with the cylinder head in the groove 41 before the cylinder head 39 is inserted in the cylinder 11. After insertion of the cylinder head 39, the snap ring 24 is inserted and the insert 28 is snapped into place. The piston 45 is then withdrawn to push the stop ring 49 against the snap ring 51, and thereafter moved in the opposite direction to push out the cylinder head 39 far enough to permit connecting the conduit 34 in the threaded opening 43. Operating fluid is then admitted through the conduit 34, and the fluid pressure acting on the cylinder head 39 is raised sufficiently to drive it any further distance required against the snap ring 24. The rings 54 and 33 then absorb fluid expanding sufficiently to tighten the cylinder head 39 and the stop ring 49 securely in position against movement in either direction.

I have herein shown and particularly described certain embodiments of my invention and certain methods of operation embraced therein for the purpose of explaining its principle of operation and showing its application, but it will be obvious to those skilled in the art that many modifications and variations are possible and I aim, therefore, to cover all such modifications and variations as fall within the scope of my invention which is defined in the appended claims.

What is claimed is:

1. In combination a hydraulic cylinder, an annular groove in the bore of said cylinder near the end thereof, a snap ring in said groove, a cylinder head, initially movable, having a shoulder adapted to engage said snap ring for limiting the extent of movement of said cylinder head, an annular groove around said cylinder head, and a ring of rubber-like material in said cylinder head groove, said rubber-like material being of the type adapted to absorb oil or the like whereby it swells and tightly holds said cylinder head within said cylinder.

2. A hydraulic operator comprising in combination a cylinder having annular grooves in the inner surface at either end thereof, a piston slidable in said cylinder having an annular groove, oil resistant resilient packing means in said annular groove for sealing said piston, initially, axially movable cylinder heads having shoulders toward the ends of the cylinder, snap rings in said annular grooves in the cylinder against which said shoulders are adapted to bear for retaining said cylinder heads in said cylinder, annular grooves in said cylinder heads, and oil absorbent packing means in said cylinder head grooves whereby said cylinder heads are tightly held in position at the ends of said cylinder upon absorption of oil whereas the piston is freely slidable in said cylinder.

3. An hydraulic operator adapted to employ a fluid as a pressure transfer medium comprising in combination a cylinder having first and second annular grooves at the inner surface at either end of the cylinder, a piston of sufficiently smaller diameter than the cylinder to provide space for packing means composed of non-absorbent material, a cylinder head initially movable at one end of the cylinder between the mid-portion of the cylinder and first of said annular grooves, a snap ring in said first annular groove for preventing expulsion of the cylinder head, an annular groove in said cylinder head, packing material in said cylinder-head annular groove composed of material tending to absorb said hydraulic fluid whereby the cylinder head is held tightly in position, an abutment upon said piston for preventing removal of said piston from the opposite end of said cylinder, a stop ring initially movable between the second annular groove in said cylinder and the mid-portion of the cylinder, a snap ring in said second annular groove for preventing removal of said cylinder stop ring from the end of said cylinder, said cylinder stop ring having an annular groove therein, and packing material in said stop-ring groove composed of material tending to absorb said fluid whereby said cylinder stop ring is held tightly in position, whereas the piston is left fully slidable in said cylinder, said cylinder head and stop ring being radially clear of their respective snap rings axially outwardly from their points of engagement therewith.

4. A hydraulic piston and cylinder assembly comprising a hydraulic cylinder member, a cylinder head having a portion slidable in the bore of said cylinder member, a circumferential groove in said cylinder head portion, a ring of rubber-like material in said groove, said rubber-like material being of the type adapted to absorb hydraulic fluid whereby it swells and forms a tight seal with the cylinder bore, recess means disposed near an end of the cylinder and opening to the bore thereof, abutment means extending inwardly from said cylinder bore and insertable in said recess means from within the cylinder bore with the cylinder head in the bore pushed in to clear said recess means, an axially outwardly facing shoulder on said cylinder head for engagement with said abutment means, said cylinder head axially outwardly of said shoulder radially clearing said abutment means, fluid conduit means opening into said cylinder, and a pison in said cylinder, whereby fluid under pressure disposed between said piston and cylinder heads may move and hold said cylinder head outwardly against said abutment means and cause said sealing ring to swell and restrain the fluid from leaking past the cylinder head.

5. A hydraulic piston and cylinder assembly comprising a hydraulic cylinder member, a cylinder head having a portion slidable in the bore of said cylinder member, a circumferential groove in said cylinder head portion, a ring of rubber-like material in said groove, said rubber-like material being of the type adapted to absorb hydraulic fluid whereby it swells and forms a tight seal with the cylinder bore, recess means disposed near an end of the cylinder and opening to the bore thereof, abutment means extending inwardly from said cylinder bore and insertable in said recess means from within the cylinder bore with the cylinder head in the bore pushed in to clear said recess means, an axially outwardly facing shoulder on said cylinder head for engagement with said abutment means, a tapered nose on said cylinder head axially outwardly of said shoulder radially clearing said abutment means, fluid conduit means opening into said cylinder, a tapered rubber-like ring in said cylinder bore outwardly of said abutment means, and a piston in said cylinder, whereby fluid under pressure disposed between said piston and cylinder heads may move and hold said cylinder head outwardly against said abutment means and cause said sealing ring to swell and restrain the fluid from leaking past the cylinder head with said tapered nose engaging said tapered rubber-like ring.

WILLIAM T. STEPHENS.

REFERENCES CITED

The following references are of record in the file of this patent:

UNITED STATES PATENTS

| Number | Name | Date |
|---|---|---|
| 1,572,822 | Stephenson | Feb. 9, 1926 |
| 1,820,069 | Herr | Aug. 25, 1931 |
| 2,145,384 | Allin | Jan. 31, 1939 |
| 2,154,817 | Leighton | Apr. 18, 1939 |
| 2,197,125 | Cox | Apr. 16, 1940 |
| 2,230,286 | Cotner | Feb. 4, 1941 |
| 2,268,543 | Coberly | Jan. 6, 1942 |
| 2,299,695 | Greene | Oct. 20, 1942 |
| 2,349,170 | Jackman | May 16, 1944 |
| 2,390,445 | Mercier | Dec. 4, 1945 |